G. WENGER.
PLOW.
APPLICATION FILED APR. 23, 1910.
986,251.
Patented Mar. 7, 1911.
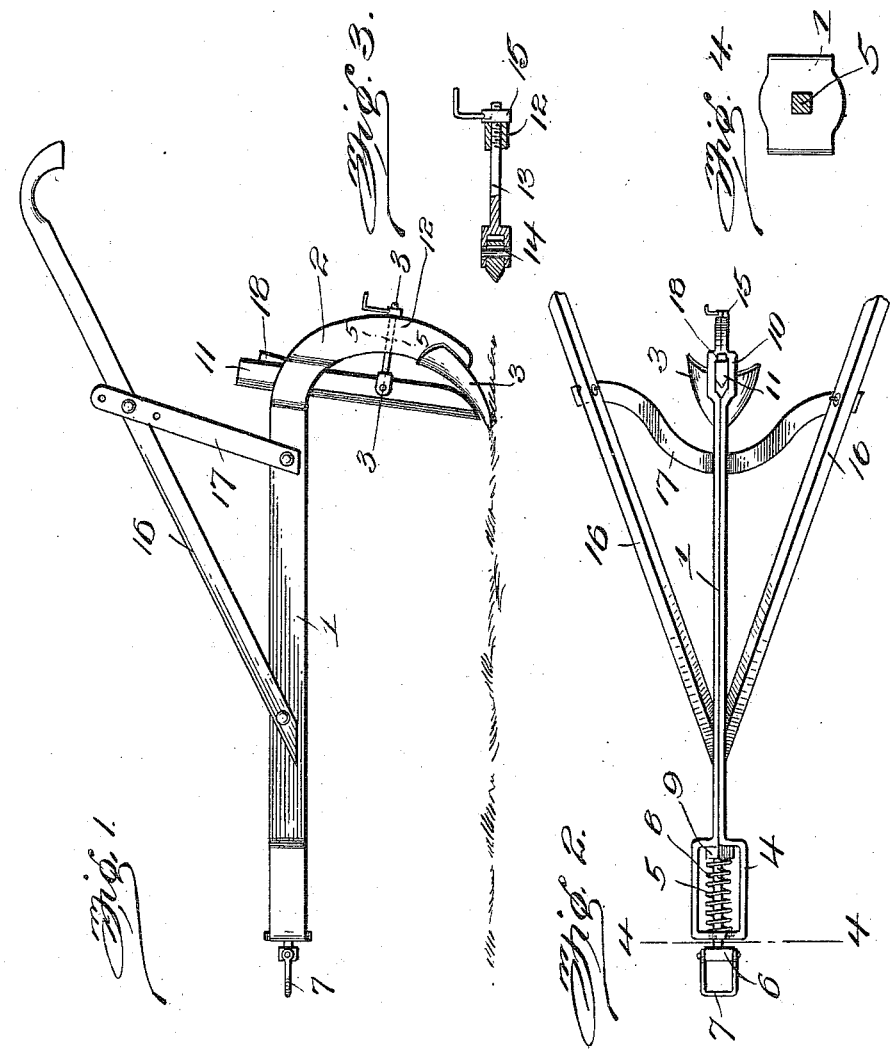

ized when ge
UNITED STATES PATENT OFFICE.

GOTTFRIED WENGER, OF SILICA, WEST VIRGINIA.

PLOW.

986,251.   Specification of Letters Patent.   Patented Mar. 7, 1911.

Application filed April 23, 1910. Serial No. 557,200.

*To all whom it may concern:*

Be it known that I, GOTTFRIED WENGER, a citizen of the United States, residing at Silica, in the county of Randolph and State of West Virginia, have invented new and useful Improvements in Plows, of which the following is a specification.

The present invention appertains to plows, the purpose being to devise a novel structure of beam for receiving a spring actuated clevis and a colter, the latter being adjustable in pitch to adapt the same to the nature of the work in hand.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a side view of a plow embodying the invention. Fig. 2 is a top plan view thereof. Fig. 3 is a horizontal section on the line 3—3 of Fig. 1. Fig. 4 is a section of the draft bar on the line 4—4 of Fig. 2, showing the end of the beam in which the draft bar is supported.

Corresponding and like parts are referred to in the following description, and indicated in all the views of the drawing, by the same reference characters.

The beam 1 in its specific construction is formed of a bar of suitable length doubled upon itself and having the rear ends bent downwardly to form a standard 2, which is provided at its lower end with a shovel blade 3 of any form. The bar at the fold is spread to provide a loop 4, which receives a draft bar 5, the latter being of square form in cross section, as indicated in Fig. 4. The outer end of the loop is widened opposite the opening formed therein through which the draft bar 5 passes. The outer end of the draft bar has a sleeve 6, which receives a pin by means of which the clevis 7 is connected thereto so as to swing vertically about a horizontal axis. A helical spring 8 of the expansible type is mounted upon the draft bar 5 and is confined between the front end of the loop 4 and a stop 9 adjustably mounted upon the rear end of the draft bar, thereby admitting of the tension of the spring 8 being regulated. The rear portion of the draft bar 5 is made rounding and threaded to receive the stop 9, which consists of a nut.

The folded portions of the bar are brought together in the rear of the loop 4 and near their rear ends are crimped to form a second loop 10, which receives the upper end of the colter 11. The rear portions of the folded parts forming the standard 2 are outwardly crimped, as indicated at 12, to provide a space through which passes a rod 13, the front end of which is forked to embrace opposite sides of the colter 11 to which they are connected by means of a fastening 14 passing through transversely alined openings formed in the members of the fork and the colter. The rear portion of the rod 13 is threaded and receives a hand nut 15, which draws the colter with its lower end close against the shovel blade 3.

Handle bars 16 are secured at their lower ends to opposite sides of the beam 1 and are supported by means of braces 17, which are pivoted at their lower ends to the rear portion of the beam and have adjustable connection at their upper ends with the handle bars.

The colter 11 consists of a bar having its front portion sharpened so as to cut through roots, turf and sod. The upper end of the colter is supported in the loop 10 of the beam and is secured therein by means of a wedge 18. The lower end of the colter touches the shovel blade 3 and is held in place by the rod 13, the latter being tightened by means of the hand nut 15.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

In an implement of the character specified, a bar doubled upon itself and having folded portions brought together and touching approximately throughout their extent, said folded bar constituting a beam and having its rear portion curved downwardly to form a standard and said bar having registering portions of the folded parts curved outwardly into crimps which form a series of openings, one opening at the front end of the beam, a second opening near the rear end of the beam, and a third opening extending horizontally through the standard at a point between the upper and lower ends thereof, substantially as and for the purpose specified.

In testimony whereof I affix my signature in presence of two witnesses.

GOTTFRIED WENGER.

Witnesses:
C. M. FISHER,
W. H. GEYER.

Copies of this patent may be obtained for five cents each, by addressing the "Commissioner of Patents, Washington, D. C."